United States Patent [19]

McGrath et al.

[11] Patent Number: 5,134,207

[45] Date of Patent: Jul. 28, 1992

[54] POLYARYLENE ETHERS AND POLYARYLENE SULFIDES CONTAINING PHOSPHINE OXIDE GROUP AND MODIFIED BY REACTION WITH ORGANOAMINE

[75] Inventors: James E. McGrath, Blacksburg, Va.; Dillip K. Mohanty, Mount Pleasant, Mich.

[73] Assignee: Virginia Tech Intellectual Properties, Inc., Blacksburg, Va.

[21] Appl. No.: 393,205

[22] Filed: Aug. 14, 1989

[51] Int. Cl.$^5$ .................. C08F 283/06; C08G 75/14; C08G 79/04

[52] U.S. Cl. .................................. 525/537; 525/390; 525/534; 525/535; 525/538

[58] Field of Search ................ 525/390, 534, 535, 538

[56] References Cited

U.S. PATENT DOCUMENTS 3,539,657 11/1970 Noshay et al. ....................... 525/534
4,108,837 8/1978 Johnson et al. ...................... 528/126
4,154,771 5/1979 Loucks et al. ....................... 525/534
4,468,502 8/1984 Malon et al. ........................ 525/390
4,607,092 8/1986 Johnson et al. ...................... 528/108
4,816,605 3/1989 Kleiner et al. ......................... 568/14
4,973,631 11/1990 McGrath et al. .................... 525/534

FOREIGN PATENT DOCUMENTS 249960 10/1987 Japan ................................. 525/390

Primary Examiner—John C. Bleutge
Assistant Examiner—Helen F. Lee
Attorney, Agent, or Firm—Richard P. Fennelly; Louis A. Morris

[57] ABSTRACT

Phosphine oxide-containing polyarylene ethers and sulfides can be reacted with organoamines to form novel graft copolymers (with monofunctional amines) or novel crosslinked thermosetting network compositions (with multifunctional amines). The network materials show desirable resistance to a variety of organic solvents including chloroform.

9 Claims, 1 Drawing Sheet

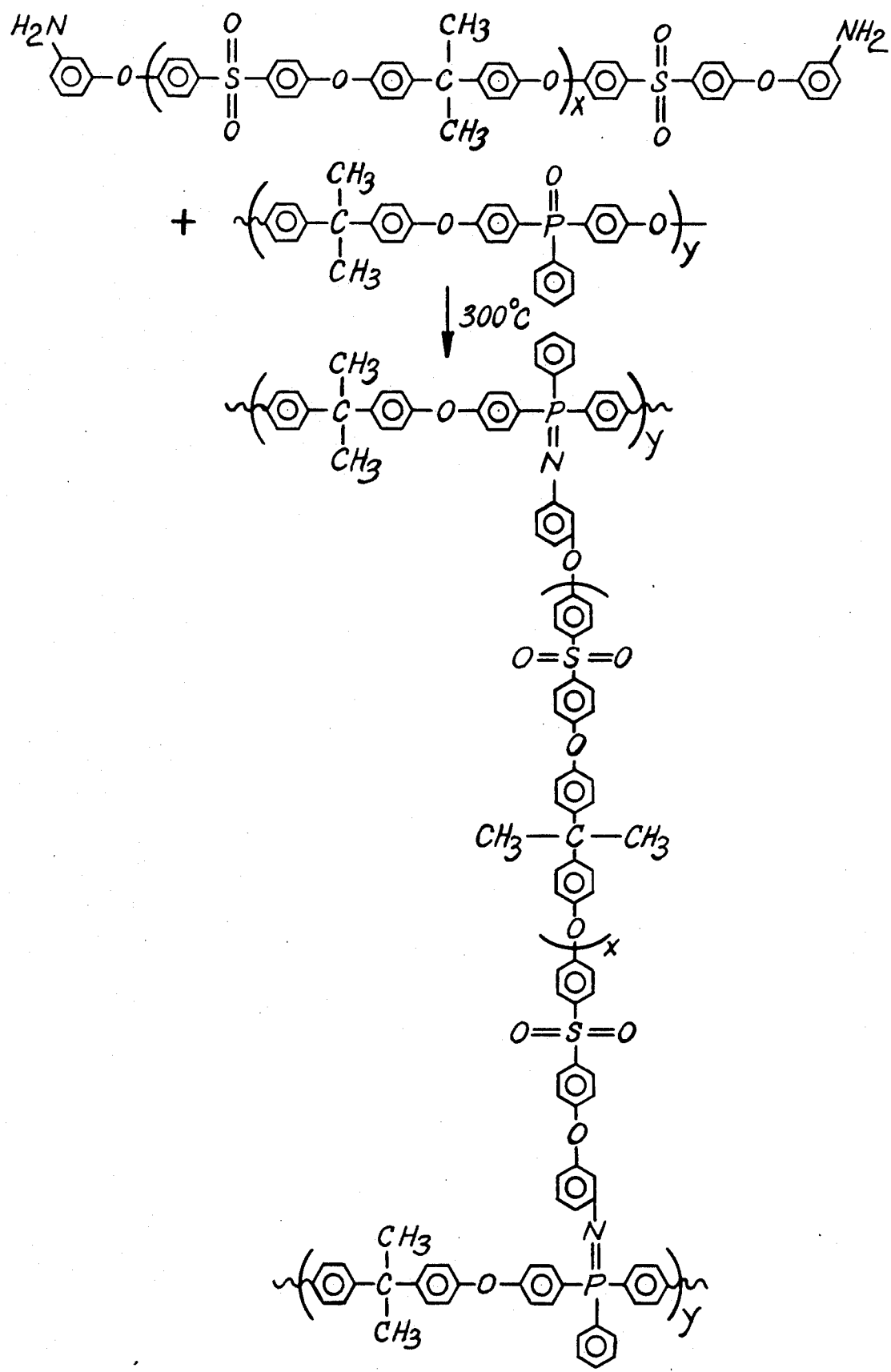

POLYARYLENE ETHERS AND POLYARYLENE SULFIDES CONTAINING PHOSPHINE OXIDE GROUP AND MODIFIED BY REACTION WITH ORGANOAMINE

BACKGROUND OF THE INVENTION

1. Field of the Invention

The present invention relates to phosphorus-containing polyarylene ethers and sulfides modified by reaction with mono-, di- or polyamine functionality.

2. Description of the Prior Art

Polyarylene ether materials which can contain a variety of divalent activating groups, including the phosphine oxide group, are shown or suggested and described in U.S. Pat. Nos. 4,108,837 and 4,175,175, for example. These polymeric materials are said to be characterized by excellent high temperature resistance, toughness and stability and each of these patents is incorporated herein by reference for their teachings. German Offen. No. 3,521,125 contains a disclosure of the following phosphorus polyoxyarylene repeating units (where Ar stands for phenyl):

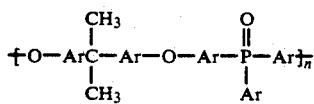

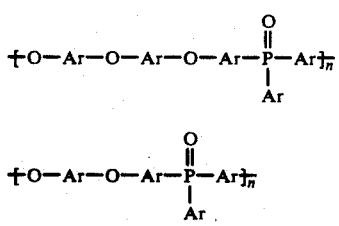

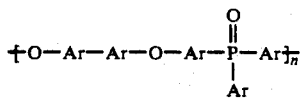

The repeating unit

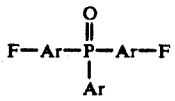

is shown in a literature reference abstracted in Chemical Abstracts, Vol. 108, 95027z (1988). Each of the above are incorporated herein to illustrate the phosphorus-containing polyoxyarylene materials which are to be reacted with the amine functionality in accordance with the present invention. As known in the art, these polymers are soluble in a number of solvents including tetrahydrofuran, chloroform, methylene chloride, dimethylsulfoxide, N-methylpyrrolidone, and dimethyl acetamide. Soluble polyarylene ether phosphine oxide materials, for example, can be prepared by reacting a bisphenol with a halogen-substituted tertiary arylphosphine oxide of the type shown in German Offen. No. 3,532,359, namely

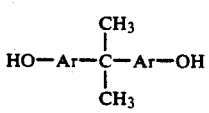

as shown in Example 1 hereinafter.

DESCRIPTION OF THE DRAWING

The Figure illustrates a representative reaction scheme where an amine functional prepolymer is used as a curing agent for a polyarylene ether phosphine oxide.

SUMMARY OF THE INVENTION

The present invention relates to such above-mentioned phosphine oxide-containing polyarylene ethers and sulfides which have been modified by reaction with amine functionality. In one embodiment, thermally crosslinkable materials are provided which have improved chemical resistance, flame retardancy and thermo-mechanical stability. In another embodiment, the reaction between amine and phosphine oxide-containing polyarylene ether or polyarylene sulfide, can be used to graft the amine-containing material onto the phosphine oxide-containing polymer.

DETAILED DESCRIPTION OF THE INVENTION

Prepolymers or engineering thermoplastics containing the phosphine oxide group (I) have been found, in one embodiment of the present invention, to be thermally crosslinkable with an amine to provide high performance materials. The phosphine oxide moiety is situated in the backbone of the polymer:

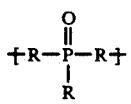

where R is substituted or unsubstituted aryl. The crosslinking reaction has been demonstrated, for example, by preparing high molecular weight soluble polyarylene ether phosphine oxides, isolating them, curing them (e.g., at 300° C.) with an alkylene diamine to yield insoluble, tough, film-forming materials which have improved chemical resistance, flame retardancy, and thermo-mechanical stability. In its broadest embodiment, the polymers can be cured in the solid state by being subjected to a temperature above the glass transition temperature of the polymeric material, e.g., from about 200° C. to about 325° C., preferably about 200° C. to about 300° C. If the curing is performed in solution, the curing temperature range could be significantly lower.

As an illustration, a soluble polyarylene ether phosphine oxide of the formula I:

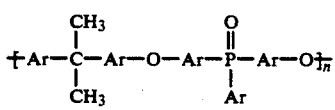

can be formed by reacting II and III, as depicted below:

(II)

HO—Ar—C(CH₃)(CH₃)—Ar—OH

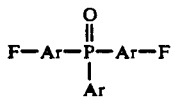
(III)

under the conditions described in Example 1 hereinbelow. The polymer which is formed is soluble in a number of organic solvents including tetrahydrofuran, chloroform, methylene chloride, dimethylsulfoxide, N-methylpyrrolidone and dimethylacetamide. Further details in regard to these phosphine oxide-containing materials are given in the references mentioned above in the discussion of the prior art. Also included within the scope of the present invention as suitable precursor materials are the analogous phosphine oxide-containing polyarylene sulfides which contain a sulfur atom in place of the oxygen atom depicted in the polymer backbone.

The number of network repeat units per polymer comprised of phosphine oxide can be varied in such precursor polymers depending upon the type of polymeric material ultimately desired. If a lightly crosslinked material is desired, the number of phosphine oxide moieties can be as low as one phosphine oxide moiety per polymer. If a much more tightly crosslinked network is desired, the number of phosphine oxide moieties can be much greater. They can be present in substantially all of the repeat units in the polymer. It is within the contemplation of the instant invention for the polymer to contain from about 1 to about 300 phosphine oxide moieties, preferably from about 5 to about 200°. In situations in which it is desired to have less than all of the repeat units contain a phosphine oxide moiety, the phosphine oxide monomer used in forming the polymers can be copolymerized with other activated aryl halide monomers typically used for synthesis of polyarylene ethers or polyarylene sulfides. Representative activated aryl halide monomers include 4,4-dichlorodiphenylsulfone, 4,4'-difluorodiphenylsulfone, and the like.

The amines which can be used to modify the phosphine oxide-containing polyarylene ethers or sulfides include monofunctional or multifunctional amines and they can be either aliphatic or aromatic. The crosslinking reaction is illustrated by Example 2, below, and changes the phosphine oxide-containing precursor polymers, which are soluble in a variety of organic solvents, into crosslinked materials which are more insoluble. For example, crosslinked materials which are insoluble in refluxing chloroform can be synthesized. The reaction between the phosphine oxide group in the precursor polymer and the amine, which can be a difunctional amine-of the formula H₂N—Ar—R—Ar—NH₂ where Ar is a phenyl ring and R is alkylene (e.g., methylene) takes place between the amino hydrogen and the oxygen of the phosphine oxide group. The following structure is formed between two polymeric chains:

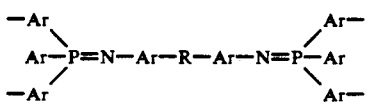

It is also within the scope of the instant invention to use amines of the general formula H₂NArOROArNH₂ where Ar is a phenyl ring and R is a polyarylene ether, a polyarylene sulfide, a polyarylene ether sulfone, or a polyarylene ether sulfide. In the Figure, the first depicted reagent containing the repeating unit depicted by "x" is an example of one type of molecule of this type.

It is believed that the crosslinking reaction of the present invention yields materials superior to conventional epoxy cured systems since a potentially reactive hydroxyl group is not formed during the reaction. The resulting materials should also be less hygroscopic than cured epoxy systems due to the absence of tertiary amine and hydroxy groups. It is believed that these characteristics will decrease the level of moisture uptake and, hence, contribute to improved environmental stability as compared to the epoxy analogues referred to earlier, particularly at elevated temperatures.

The Figure provides an example of using an amine functional prepolymer (a polyarylene ether sulfone oligomer with aromatic amine termination) as a curing agent with a polyarylene ether phosphine oxide. The first step, in such a scenario, would involve the preparation of the depicted aromatic amine-terminated polyarylene ether sulfone oligomer followed by using it to cure the also preformed polyarylene ether phosphine oxide. Such a crosslinked product should have long shelf life.

Another embodiment of the present invention utilizes the reactivity between the phosphine oxide moiety of the aforementioned polymers and an amine moiety to achieve grafting rather than crosslinking. For example, a monoamine functional polyether, such as polypropylene oxide or polyethylene oxide or a polydimethylsiloxane prepared anionically, could be grafted onto the polyarylene ether or sulfide phosphine oxide. The resulting novel material could be useful as a perm selective membrane material or as a toughened glass.

Another embodiment of the present invention can utilize mixtures of monoamine terminated prepolymers and multifunctional amines to produce novel crosslinked membrane materials.

It is also within the contemplation to have the polyarylene ether and polyarylene sulfide materials containing the phosphine oxide group(s) in admixture with other engineering plastics (e.g., ether sulfones) and/or elastomers in a range of from about 1 mole % to about 99 mole % to yield crosslinked compositions containing such blended polymeric components. When the engineering plastic or elastomer which is selected as the other additive is not crosslinked by the action of the organoamine, the degree of crosslinking of the composite structure will be dictated by the proportion of the composition which is constituted by the novel, crosslinkable embodiment of the present invention.

The Examples which follow provide certain additional information on certain embodiments of the instant invention.

EXAMPLE 1

This Example illustrates the preparation of a poly(arylene ether) phosphine oxide.

A 250 ml 4-neck, round bottom flask, equipped with an overhead stirrer, a nitrogen inlet, a Dean-Stark trap with condenser and a thermometer, was charged with 5.7 grams (0.025 mole) bisphenol-A and 7.85 grams (0.025 mole) bis-parafluorophenyl phenyl phosphine oxide. The polytetrafluoroethylene-coated aluminum pans used to transfer the monomers were rinsed into the flask with NMP, for a total volume of 85 ml. An excess of potassium carbonate (10 grams, 0.07 mole) and 45 ml of toluene were added to the reaction mixture. A constant purge of nitrogen was maintained and the temperature was controlled by a silicone oil bath. The toluene and water azeotroped at 140° C. and the system was allowed to dehydrate about four hours. Next, the temperature was raised to 160° C. and held for eight hours. The solution was dark brown with a white heterogeneous inorganic salt suspension. Finally, the mixture was allowed to cool, diluted with an equal volume of tetrahydrofuran and filtered. Glacial acetic acid was added to the filtrate to neutralize the solution, which was then precipitated in 75/25 methanol-water in a high speed blender. The polymer was dried at 80° C. in a vacuum oven for sixteen hours, redissolved in chloroform, filtered, reprecipitated, and dried again under the same conditions. The resulting polymer had an intrinsic viscosity of 0.40 dl/gm when measured in tetrahydrofuran at 25° C. Its glass transition temperature by DSC was about 190° C.

EXAMPLE 2

This illustrates the crosslinking of the poly(arylene ether) phosphine oxide of Example 1.

Five grams of the poly(arylene ether) phosphine oxide and 0.055 gram of methylene dianiline were solution blended in chloroform and a film of the blended material was dried at 80° C. in a vacuum oven to constant weight. The dried film of the blend was cured in a press at 300° C. for up to a one hour time period. The initial sample from Example 1, which was soluble in many solvents, including chloroform, was thereby transformed into a network or cured-type specimen which was greater than 90% insoluble in boiling chloroform.

The foregoing Examples should not be construed in a limiting sense since they are intended to merely illustrate certain embodiments of the present invention. The claims which follow define the subject matter for which protection is sought.

We claim:

1. Polyarylene ether or polyarylene sulfide polymers containing phosphine oxide units which have been reacted with a primary organoamine to form grafted or crosslinked polymers.

2. Polymers as contained in claim 1 wherein the organoamine is a monofunctional amine and is grafted to the polymers.

3. Polymers as contained in claim 1 wherein the organoamine is a multifunctional amine which crosslinks the compositions.

4. Polymers as claimed in claim 1 which contain from about 1 to about 300 phosphine oxide moieties perspective polymer.

5. Polymers as claimed in claim 3 wherein the multifunctional amine is of the formula $$H_2N-Ar-R-Ar-NH_2$$

where Ar is phenyl and R is alkylene.

6. Polymers as claimed in claim 3 wherein the multifunctional amine is of the formula $$H_2NArOROArHN_2$$

where Ar is phenyl and R is alkylene.

7. Polymers as claimed in claim 1 wherein a poly(arylene ether)phosphine oxide is crosslinked with a difunctional amine.

8. Polymers as claimed in claim 1 wherein the poly(arylene ether)phosphine is formed by reaction of bisphenol-A and a bis-fluorophenyl phenyl phosphine oxide.

9. Polymers as claimed in claim 7 wherein the difunctional amine is methylene dianiline.

* * * * *